(12) United States Patent
Narasimha et al.

(10) Patent No.: US 8,774,135 B2
(45) Date of Patent: Jul. 8, 2014

(54) METHOD AND APPARATUS FOR RADIO LINK FAILURE RECOVERY

(75) Inventors: Murali Narasimha, Lake Zurich, IL (US); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 494 days.

(21) Appl. No.: 12/542,314

(22) Filed: Aug. 17, 2009

(65) Prior Publication Data

US 2011/0039546 A1 Feb. 17, 2011

(51) Int. Cl.
*H04W 4/00* (2009.01)
*H04W 36/00* (2009.01)
*H04W 36/30* (2009.01)
*H04W 84/04* (2009.01)

(52) U.S. Cl.
CPC ...... *H04W 36/0055* (2013.01); *H04W 36/0088* (2013.01); *H04W 36/30* (2013.01); *H04W 84/045* (2013.01)
USPC ........... 370/332; 370/328; 370/331; 455/436; 455/437

(58) Field of Classification Search
None
See application file for complete search history.

(56) References Cited

U.S. PATENT DOCUMENTS

| | | | |
|---|---|---|---|
| 5,940,371 A * | 8/1999 | Mitts et al. | 370/236 |
| 6,078,813 A * | 6/2000 | Ljung | 455/436 |
| 6,337,983 B1 | 1/2002 | Bonta et al. | |
| 6,512,927 B2 | 1/2003 | Hunzinger | |
| 6,553,231 B1 | 4/2003 | Karlsson et al. | |
| 7,082,303 B2 | 7/2006 | Sayeedi et al. | |
| 2003/0003906 A1 * | 1/2003 | Demers et al. | 455/424 |
| 2003/0086394 A1 * | 5/2003 | Zeira et al. | 370/331 |
| 2005/0020240 A1 * | 1/2005 | Minter | 455/404.1 |
| 2005/0043046 A1 * | 2/2005 | Lee | 455/502 |
| 2006/0111110 A1 * | 5/2006 | Schwarz et al. | 455/439 |
| 2009/0046573 A1 | 2/2009 | Damnjanovic | |
| 2009/0046578 A1 | 2/2009 | Aydin et al. | |
| 2009/0061878 A1 * | 3/2009 | Fischer | 455/436 |
| 2009/0104905 A1 * | 4/2009 | DiGirolamo et al. | 455/434 |
| 2009/0185524 A1 * | 7/2009 | Sammour et al. | 370/328 |
| 2009/0274086 A1 * | 11/2009 | Petrovic et al. | 370/312 |

FOREIGN PATENT DOCUMENTS

| | | |
|---|---|---|
| EP | 1720373 A1 | 11/2006 |
| WO | 2008114180 A2 | 9/2008 |
| WO | 2009044317 A2 | 4/2009 |
| WO | 2009051534 A1 | 4/2009 |
| WO | 2009054702 A1 | 4/2009 |
| WO | 2009099811 A1 | 8/2009 |

OTHER PUBLICATIONS

3GPP; TS 36.331; 3rd Generation Partnership Project; Technical Specification Group Radio Access Network; Evolved Universal Terrestrial Radio Access (E-UTRA); Radio Resource Control (RRC); Protocol Specification; Release 8; Jun. 2009.

(Continued)

*Primary Examiner* — Kibrom T Hailu
*Assistant Examiner* — James P Duffy (57) ABSTRACT

A method (300) and apparatus (200) for radio link failure recovery is disclosed. The method may include detecting (320) the presence of an intra-frequency neighbor base station (145) of a serving base station (135). The method may include determining (330) that a radio link parameter of an inter-frequency neighbor base station is better than a threshold. The method may include acquiring (350) system information of the inter-frequency neighbor base station if the intra-frequency neighbor base station is present and if the radio link parameter of the inter-frequency neighbor base station is better than the threshold.

16 Claims, 5 Drawing Sheets

(56) References Cited

OTHER PUBLICATIONS

3GPP TSG-RAN WG2#67bis, R2-095931 R2-094652 "Radio Link Failure in CSG deployments" Motorola, Oct. 12-16, 2009, Miyazaki, Japan, 2 pages.

Patent Cooperation Treaty, "PCT Search Report and Written Opinion of the International Searching Authority" for International Application No. PCT/US2010/042560 Dec. 29, 2010, 14 pages.

3GPP TSG-RAN WG4#48bis, R4-082384 "Discussion of reselection handling towards non-allowed CSG cell (response to incoming LS R2-084891)" Qualcomm Europe, Edinburgh, UK, Sep. 29-Oct. 3, 2008, 4 pages.

3GPP TSG-RAN WG2#66bis, R2-094091 "Proposed Way forward for H(e)NB Inbound Mobility Discussion" Motorola, Los Angeles, USA, Jun. 29-Jul. 3, 4 pages.

3GPP TSG-RAN WG2#67, R2-094652 "Radio Link Failure in CSG deployments" Motorola, Shenzhen, China, Aug. 24-28, 2009, 2 pages.

\* cited by examiner

METHOD AND APPARATUS FOR RADIO LINK FAILURE RECOVERY

RELATED APPLICATIONS

This application is related to the application entitled "Method and Apparatus for Mobile Communication Device Measurement Reporting," U.S. application Ser. No. 12/542,280, filed Aug. 17, 2009, and the application entitled "Method and Apparatus for Radio Link Failure Recovery," U.S. application Ser. No. 12/542,339, filed Aug. 17, 2009, each of which is filed on the same date as the present application, each of which is commonly assigned to the assignee of the present application, and each of which is incorporated herein by reference in its entirety.

BACKGROUND

1. Field

The present disclosure is directed to a method and apparatus for radio link failure recovery. More particularly, the present disclosure is directed to acquiring system information prior to radio link failure.

2. Introduction

Presently, wireless communication devices, such as cellular phones, personal digital assistants, cellular wireless equipped laptop computers, and other wireless communication devices, provide mobile communication ability for users. Unfortunately, a wireless communication device can drop a connection to a cellular network when it experiences radio link failure. A radio link failure occurs when a wireless communication device that is connected to a cell experiences a sudden deterioration of the signal such that normal communication can no longer be maintained. The deterioration occurs so rapidly that the link between the wireless communication device and the serving cell fails before the wireless communication device can be handed over to another cell. In a typical cellular deployment, radio link failure occurs when a wireless communication device suddenly experiences shadowing, such as when the wireless communication device turns a corner and the signal from the serving cell is obstructed by a building.

Radio link failure can also be caused by a sudden increase in interference from neighbor cells accompanied by shadowing of the serving cell. This is a significant problem in a heterogeneous network, where macro cells, femtocells, and picocells overlap on the same carrier frequency. For example, the femtocells and picocells can be deployed in homes and offices for preferential services to users. A wireless communication device connected to a macro cell can experience a sudden increase in interference from a femtocell or picocell, for example, when the user enters a building where the femtocell or picocell is located. Femtocell and picocell deployments can ultimately be quite common, such as with the introduction of long term evolution closed subscriber group cells, and there can be hundreds of such cells within the coverage of a macro cell. As a result, a wireless device is more likely to experience radio link failure in a heterogeneous network than in a conventional network.

Presently, when a wireless communication device experiences a radio link failure, it goes through a connection reestablishment procedure. Unfortunately, the current procedure has drawbacks. One drawback is the delay in reestablishment. For example, the current contention based random access procedure has significant delays due to the need to perform contention resolution. Moreover, the wireless communication device has to first acquire system information of the target cell to perform random access, and this can add significant delay to the recovery procedure. Another drawback is that the current reestablishment procedure does not adequately support home cells, such as femtocells or picocells. For example, the general assumption is that only cells at the same base station are prepared for handover. This implies that radio link failures in some scenarios involving home cells in heterogeneous networks are unrecoverable. A further drawback is that there is no mechanism to forward pending data from the source cell to a reestablishment target. This results in a loss of a substantial amount of user data. Furthermore, if reestablishment is to occur on a cell that is on a different frequency, such as when the primary interferer is a closed subscriber group cell to which the wireless communication device does not have access, there is currently no mechanism to trigger the system information acquisition of the target cell.

Thus, there is a need for an improved method and apparatus for radio link failure recovery.

SUMMARY

A method and apparatus for radio link failure recovery is disclosed. The method may include detecting the presence of an intra-frequency neighbor base station of a serving base station. The method may include determining that a radio link parameter of an inter-frequency neighbor base station is better than a threshold. The method may include acquiring system information of the inter-frequency neighbor base station if the intra-frequency neighbor base station is present and if the radio link parameter of the inter-frequency neighbor base station is better than the threshold.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
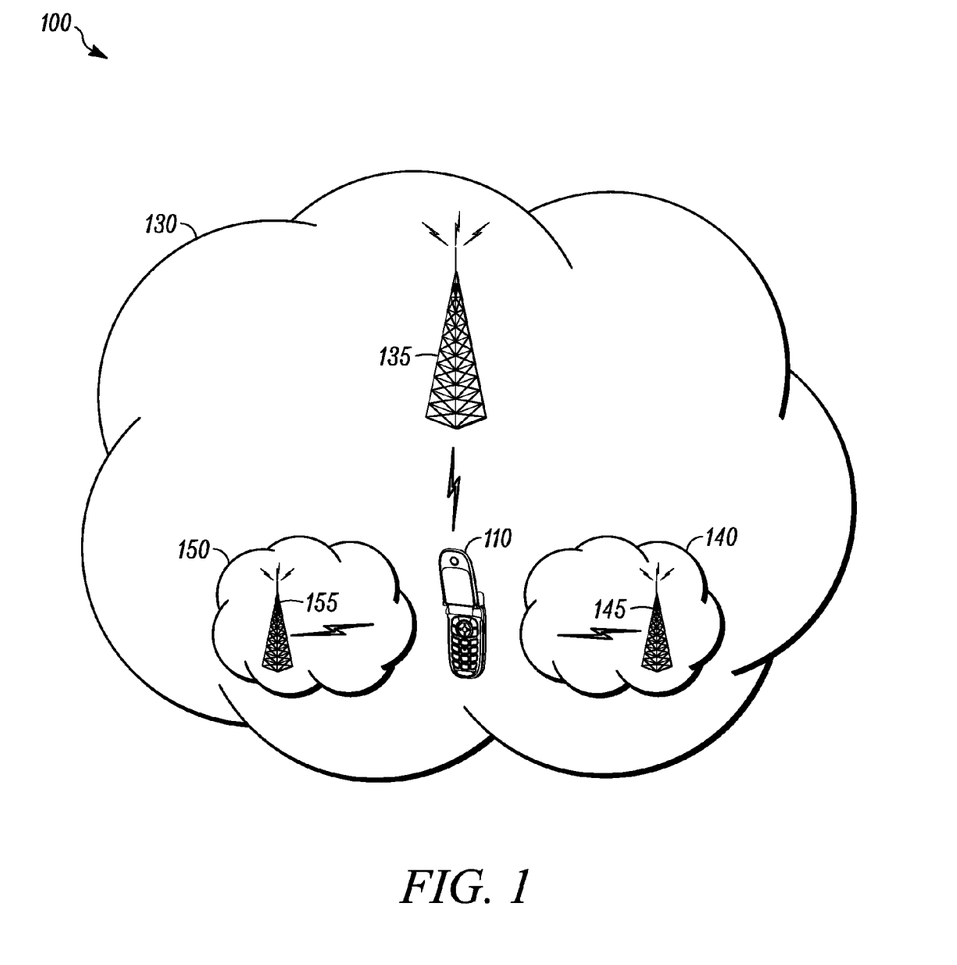
FIG. 1 illustrates an exemplary block diagram of a system in accordance with a possible embodiment.

FIG. 1 is an exemplary block diagram of a system 100 according to a possible embodiment. The system 100 can include a terminal 110, a serving cell 130 including a serving base station 135, a first cell 140 including a first base station 145, such as an intra-frequency neighbor base station, and a second cell 150 including a second base station 155, such as an inter-frequency neighbor base station. The intra-frequency neighbor base station 145 can provide cell coverage on a same frequency as the serving base station 135. The inter-frequency neighbor base station 155 can provide cell coverage on a different frequency from the serving base station 135.

The base stations 135, 145, and 155 can be macro base stations, home base stations, access points or other base stations. For example, the second cell 150 can be a home cell or can be a macro cell. The terminal 110 may be a mobile station, such as a wireless communication device, which can be a wireless telephone, a cellular telephone, a personal digital assistant, a pager, a personal computer, a selective call receiver, or any other device that is capable of sending and receiving communication signals on a network, including a wireless network. The cells 130, 140, and 150 can be macro cells or home cells, such as closed subscriber group (CSG) cells, hybrid cells, femtocells, picocells, relay nodes, or other candidate cells. For example, home cells can be cells with small footprint, such as low power as compared to a macro cell. The first cell 140 can be located within a coverage area of the serving cell 130. As a further example, the base stations 145 and 155 can be home base stations, like user base stations, home NodeBs, Third Generation Partnership Project (3GPP) home NodeBs, closed subscriber group (CSG) base stations, as defined in a third generation partnership project based standard, and/or can be any other home base station. A third generation partnership project home NodeB can also be a long term evolution (LTE) closed subscriber group or hybrid base station based on present third generation partnership project long term evolution closed subscriber group base station features. A base station can also be a Universal Mobile Telecommunications System (UMTS) home base station or a typical macro base station. Furthermore, a long term evolution closed subscriber group cell, such as the cells 130, 140, and 150, can include any cell that is a present or future result of present and/or future modified third generation partnership project long term evolution closed subscriber group cell features.

The system 100 can be a wireless telecommunications network, such as a Time Division Multiple Access (TDMA) network, like a $3^{rd}$ Generation Partnership Project (3GPP) Long Term Evolution (LTE) network, can be a Universal Mobile Telecommunications System (UMTS), and/or can be other like communications systems. Furthermore, the system 100 may include more than one network and may include a plurality of different types of networks.

In operation, the terminal 110 can detect the presence of an intra-frequency neighbor base station 145 of a serving base station 135. The terminal 110 can determine that a radio link parameter of an inter-frequency neighbor base station 155 is better than a threshold. The terminal 110 can acquire system information of the inter-frequency neighbor base station 155 if the intra-frequency neighbor base station 145 is present and if the radio link parameter of the inter-frequency neighbor base station 155 is better than the threshold. The radio link parameter of the inter-frequency neighbor base station 155 can be a measured parameter of the inter-frequency neighbor base station 155. The radio link parameter of the inter-frequency neighbor base station 155 can also be computed from at least a plurality of measured parameters, the plurality of measured parameters including a measured parameter of the inter-frequency base station 155. Depending on the radio link parameter, the terminal 110 can determine that the radio link parameter of an inter-frequency neighbor base station 155 is better than a threshold by determining that the radio link parameter is higher than the threshold. Depending on the radio link parameter, the terminal 110 can also determine that the radio link parameter of an inter-frequency neighbor base station 155 is better than a threshold by determining that the radio link parameter is lower than the threshold.

In a corresponding operation, the base station 135 can receive a measurement report from a mobile station 110 indicating presence of a cell 140 operating on the same frequency as the base station 135. The base station 135 can identify an alternate base station 155 on a different frequency in response to receiving the measurement report. The base station 135 can instruct the mobile station 110 to acquire system information of the alternate base station 155.

For example, the assumption for typical radio resource control reestablishment procedures in a conventional macro network is that a terminal is highly likely to reestablish its connection to the same cell on which it experiences radio link failure or another cell of the same base station. This assumption is not valid for heterogeneous networks. For example, if a terminal approaches a closed subscriber group cell, the following two scenarios are possible. In the first scenario, a terminal is allowed to access the home cell, but the high signal strength of the home cell causes radio link failure before the network can prepare the home cell for handover and perform handover. In this case, the reestablishment is likely to occur on the home cell. In the second scenario, the terminal is not allowed to access the home cell and the high signal strength of the home cell causes radio link failure before the terminal can be handed over to a cell on another frequency. In this case, the reestablishment is likely to occur on a cell on another frequency. An example of a cell that the terminal is not allowed to access is a closed subscriber group cell for which the terminal does not have access rights.

Typically, for both of the above scenarios, the reestablishment procedure can take unacceptably long. To shorten the reestablishment procedure, reestablishment can be performed on a cell of an alternate frequency. When a terminal sends a measurement report to the serving cell, indicating the presence of a closed subscriber group cell, the serving cell may not be able to determine whether the terminal is allowed to access the reported closed subscriber group cell. Therefore, in order to enable a quick recovery upon radio link failure occurrence due to the second scenario above, a procedure can be used where the terminal can send a measurement report to the serving base station indicating presence of a closed subscriber group cell. The serving base station can prepare an alternate cell on another frequency and more than one alternate cell can be prepared. The serving base station can assign gaps for system information acquisition and can instruct the terminal to acquire the master information block, the system information block, SIB1, and the system information block, SIB2, of the alternate cell. The terminal can acquire the required system information of the alternate cell. When the terminal experiences radio link failure on the serving cell, the terminal can perform reestablishment on the alternate cell. Reestablishment can be faster than typical reestablishment because the terminal has already acquired system information of the alternate cell.

Alternatively, the serving base station can instruct the terminal to acquire the system information of a candidate cell on the same frequency. The terminal can acquire the required system information of the cell and determine that the terminal is not allowed to access the candidate cell. Optionally, the terminal can send a message to the serving cell indicating that the terminal is not allowed to access the candidate cell. When the terminal experiences radio link failure on the serving cell, the terminal can perform reestablishment on an alternate cell. The alternate cell may be a cell on a different frequency. The terminal can avoid attempting reestablishment on the candidate cell and instead perform reestablishment on the alternate cell. Thus, the reestablishment can have a higher likelihood of success.

Another approach can include configuring a measurement event in the terminal, which can be triggered when the terminal detects a closed subscriber group cell on the serving frequency and a radio link parameter, such as a reference signal received power parameter of an alternate cell exceeds a threshold. For example, the base station can configure, at the terminal, a measurement event-X, such as "intra-frequency neighbor becomes better than threshold1 and inter-frequency neighbor becomes better than threshold2." Threshold1 can be set to a low value to enable triggering the event when the intra-frequency neighbor is detected, such as when a closed subscriber group cell is detected. It can be assumed that a measurement configuration for the alternate frequency has already been provided to the terminal. For example, the terminal has gaps to detect and measure cells on the alternate frequency. The intra-frequency neighbor cells in the event description can be a subset of all non-serving intra-frequency neighbor cells, such as closed subscriber group cells or hybrid cells. In the case of closed subscriber group cells, the subset can be represented by a physical cell identifier range reserved for closed subscriber group cells. In the case of hybrid cells, the physical cell identifier range corresponding to hybrid cells can be signaled as part of the event configuration, or the hybrid cells could have a reserved physical cell identifier range. Alternatively, the event can be applied to all non-serving intra-frequency neighbor cells, including macro cells. A further restriction can be applied so that the event triggers only when the intra-frequency neighbor is a cell that the terminal is not allowed to access, such as when the physical cell identifier of intra-frequency neighbor is not in the terminal's allowed closed subscriber group list. The terminal determines that cell A, the intra-frequency neighbor cell, and cell B, the inter-frequency neighbor cell, satisfy the first and second criteria of the event. The terminal can send a measurement report indicating that event X has triggered and including measurements of cells A and B. The serving base station can then prepare cell B for potential reestablishment. The serving base station can also assign gaps to the terminal for system information acquisition and can instruct the terminal to acquire the master information block, the system information block, SIB1, and the system information block, SIB2, of cell B. The terminal can then acquire the required system information of cell B. When the terminal experiences radio link failure on the serving cell, the terminal can perform reestablishment on cell B. Reestablishment can be faster than typical reestablishment because the terminal has already acquired system information of cell B.

According to a related embodiment, a serving base station can prepare a second base station for recovery of a mobile station from radio link failure. The serving base station can detect that the mobile station has experienced a radio link failure on the serving base station and can forward buffered packets to the second base station if the mobile station has experienced a radio link failure.

For example, the terminal can send a measurement report to the serving base station indicating presence of a closed subscriber group cell. The serving base station can prepare an alternate cell for potential reestablishment. The alternate cell can be a closed subscriber group cell or can be a different cell. The serving base station can assign gaps to the terminal for system information acquisition and can instruct the terminal to acquire the master information block, the system information block, SIB1, and the system information block, SIB2, of the alternate cell. The terminal acquires the required system information of the alternate cell. When the terminal experiences radio link failure on the serving cell, the serving base station can detect that the terminal has experienced radio link failure and forwards packets to the alternate cell. The terminal can then perform reestablishment on the alternate cell. Reestablishment can be faster than typical reestablishment because the terminal has already acquired system information of the alternate cell and because there is no delay in retrieving buffered data from the serving base station.

Figure 2:
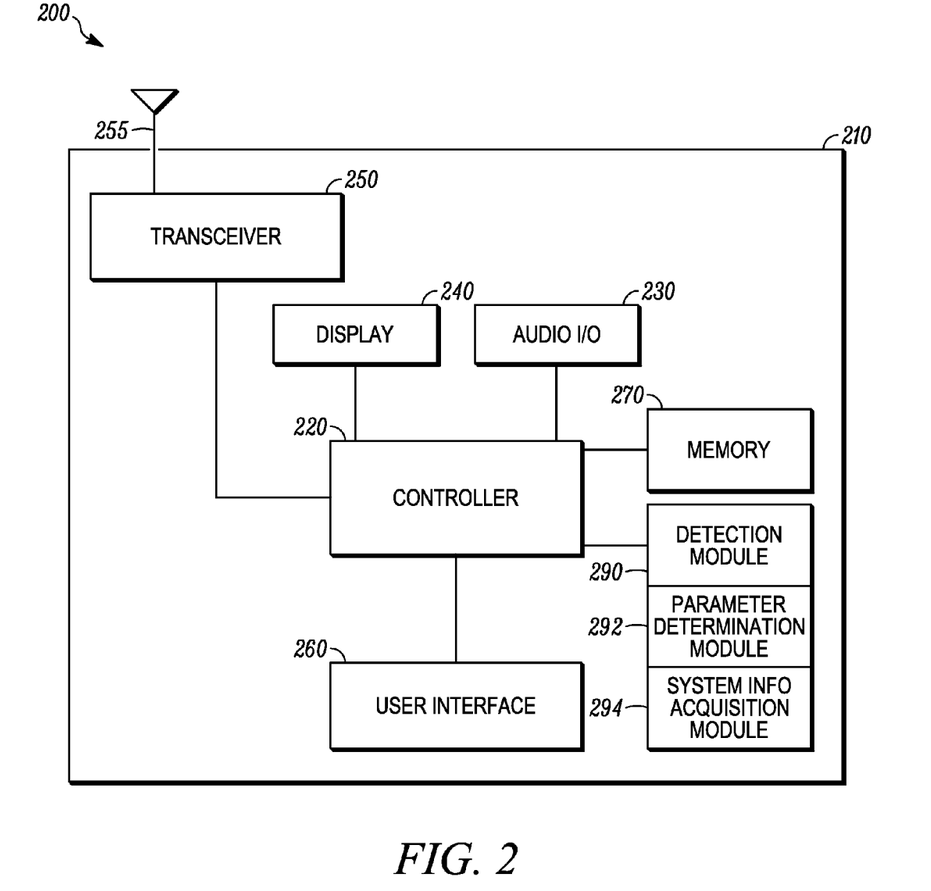
FIG. 2 illustrates an exemplary block diagram of a wireless communication device in accordance with a possible embodiment.

FIG. 2 is an exemplary block diagram of a wireless communication device 200, such as the terminal 110, according to a possible embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, an antenna 255 coupled to the transceiver 250, a user interface 260 coupled to the housing 210, and a memory 270 coupled to the housing 210. The wireless communication device 200 can also include an intra-frequency neighbor base station detection module 290, an inter-frequency neighbor base station parameter determination module 292, and a system information acquisition module 294. The intra-frequency neighbor base station detection module 290, the inter-frequency neighbor base station parameter determination module 292, and the system information acquisition module 294 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control operations of the wireless communication device 200. The intra-frequency neighbor base station detection module 290 can detect the presence of an intra-frequency neighbor base station of a serving base station. The inter-frequency neighbor base station parameter determination module 292 can determine that a radio link parameter of an inter-frequency neighbor base station is better than a threshold. For example, the radio link parameter can be a reference signal received power parameter, a signal strength parameter, a signal to noise ratio parameter, or any other useful parameter or combination of parameters that can be compared to a threshold. The system information acquisition module 294 can acquire system information of the inter-frequency neighbor base station if the intra-frequency neighbor base station is present and if the radio link parameter of the inter-frequency neighbor base station is better than a threshold.

The intra-frequency neighbor base station detection module 290 can also determine that a radio link parameter of an intra-frequency neighbor base station is better than another threshold. The radio link parameter of the intra-frequency neighbor base station can be a measured parameter of the intra-frequency neighbor base station. The radio link parameter of the inter-frequency neighbor base station can also be computed from at least a plurality of measured parameters, where the plurality of measured parameters can include a measured parameter of the intra-frequency base station. The system information acquisition module 294 can acquire system information of the inter-frequency neighbor base station if the radio link parameter of the inter-frequency neighbor base station is better than a threshold. The system information acquisition module 294 can acquire system information of the inter-frequency neighbor base station if the radio link parameter of the inter-frequency neighbor base station is better than a threshold and if the radio link parameter of the intra-frequency neighbor base station is better than a threshold. Depending on the radio link parameter, the terminal can determine that the radio link parameter of an intra-frequency neighbor base station is better than a threshold by determining that the radio link parameter is higher than the threshold. Depending on the radio link parameter, the terminal can also determine that the radio link parameter of an intra-frequency neighbor base station is better than a threshold by determining that the radio link parameter is lower than the threshold.

The controller 220 can send, via the transceiver 250, a measurement report to the serving base station. The measurement report can indicate that the radio link parameter of the inter-frequency neighbor base station is better than the threshold and can indicate that the radio link parameter of the intra-frequency neighbor base station is better than another threshold. The measurement report can include measurements of parameters of the intra-frequency neighbor base station and the inter-frequency neighbor base station. The controller 220 can also determine that the intra-frequency neighbor base station is a home base station.

The controller 220 can determine that the mobile station is not allowed to access the intra-frequency neighbor base station. The system information acquisition module 294 can acquire system information of the inter-frequency neighbor base station if the intra-frequency neighbor base station is present and if the radio link parameter of the inter-frequency neighbor base station is better than a threshold. The controller 220 can also determine radio link failure on the serving base station after acquiring system information and can perform reestablishment on the inter-frequency neighbor base station using the acquired system information in response to determining radio link failure on the serving base station.

The transceiver 250 can receive an instruction from the serving base station to acquire the system information of the inter-frequency neighbor base station. The transceiver 250 can be configured to receive gap assignments for system information acquisition if the radio link parameter of the inter-frequency neighbor base station is better than the threshold. The transceiver 250 can be configured to receive buffered data after performing reestablishment.

Figure 3:
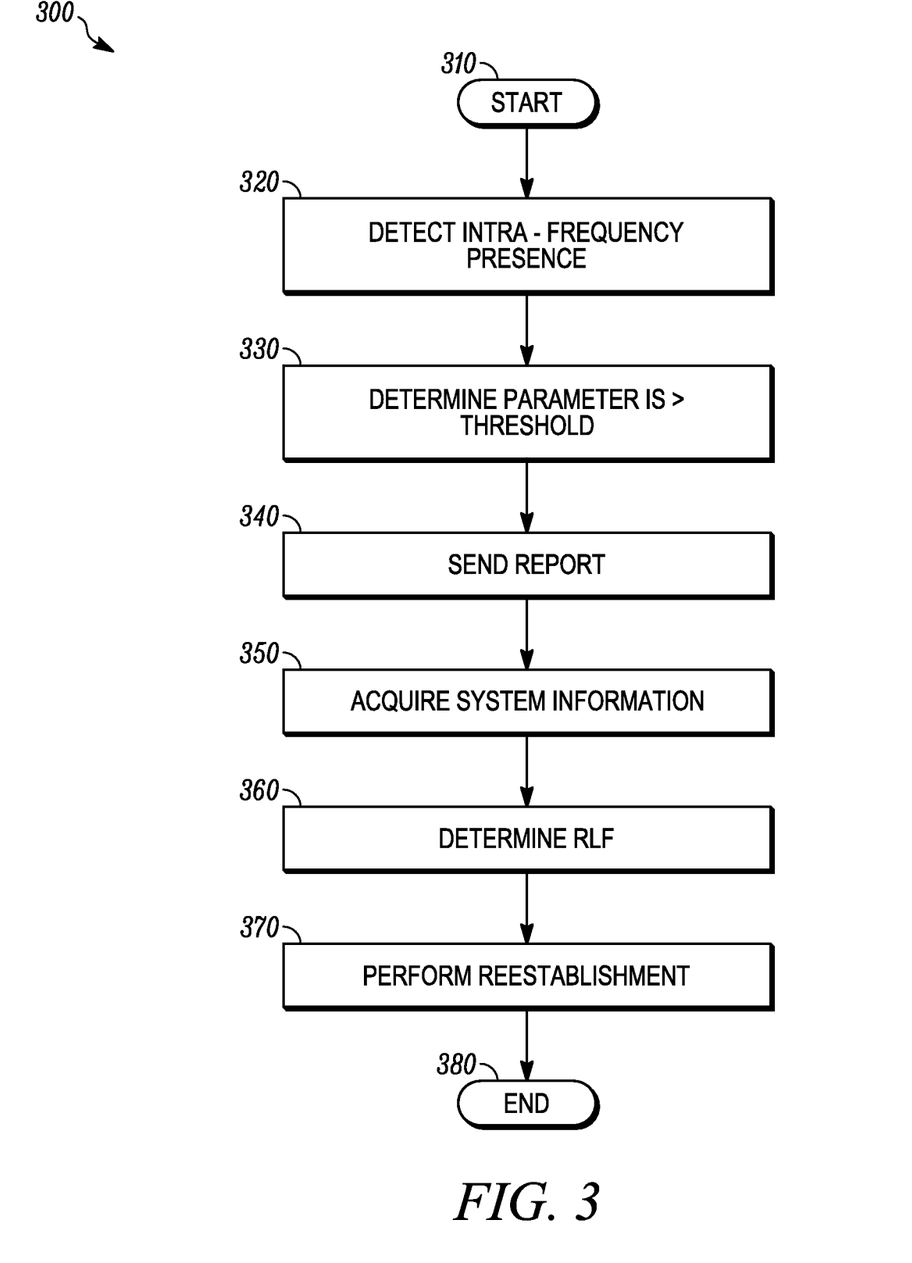
FIG. 3 is an exemplary flowchart illustrating the operation of a wireless communication device in accordance with a possible embodiment.

FIG. 3 is an exemplary flowchart 300 illustrating the operation of the wireless communication device 200 according to a possible embodiment. At 310, the flowchart begins. At 320, the presence of an intra-frequency neighbor base station of a serving base station is detected. Detecting the presence of an intra-frequency neighbor base station can include determining that a radio link parameter of an intra-frequency neighbor base station is better than a threshold. Detecting the presence of an intra-frequency neighbor base station can include determining that the intra-frequency neighbor base station is a home base station. For example, the wireless communication device 200 can determine that the intra-frequency neighbor base station is a home base station based on a neighbor base station physical cell identifier being in a range of physical cell identifiers corresponding to home base stations. The method can also be applied to all cells, including home cells and macro cells.

At 330, a radio link parameter of an inter-frequency neighbor base station can be determined to be better than a threshold. The radio link parameter can be a reference signal received power parameter. At 330, it can also be determined that the wireless communication device 200 is not allowed to access the intra-frequency neighbor base station.

At 340, a measurement report can be sent to the serving base station. The measurement report can indicate that the radio link parameter of an inter-frequency neighbor base station is better than a threshold and can indicate that the radio link parameter of an intra-frequency neighbor base station is better than another threshold. The measurement report can include measurements of parameters of the intra-frequency neighbor base station and the inter-frequency neighbor base station. At 340, an instruction can also be received from the serving base station to acquire system information of the inter-frequency neighbor base station. Furthermore, gap assignments for system information acquisition can be received if the radio link parameter of the inter-frequency neighbor base station is better than a threshold. For example, a gap can be a duration in which the serving cell does not schedule data for the wireless communication device 200.

At 350, system information of the inter-frequency neighbor base station can be acquired if the intra-frequency neighbor base station is present and if the radio link parameter of the inter-frequency neighbor base station is better than a threshold. System information of the inter-frequency neighbor base station can be acquired if the radio link parameter of the inter-frequency neighbor base station is better than a threshold and if the radio link parameter of the intra-frequency neighbor base station is better than another threshold. For example, a physical cell identifier of a closed subscriber group cell may not be in a wireless communication device listing of closed subscriber group cells that the wireless communication device 200 is allowed to access.

At 360, radio link failure on the serving base station is determined after acquiring system information. At 370, reestablishment is performed on the inter-frequency neighbor base station using the acquired system information in response to determining radio link failure on the serving base station. Buffered data can be received after performing reestablishment. At 380, the flowchart 300 ends.

Figure 4:
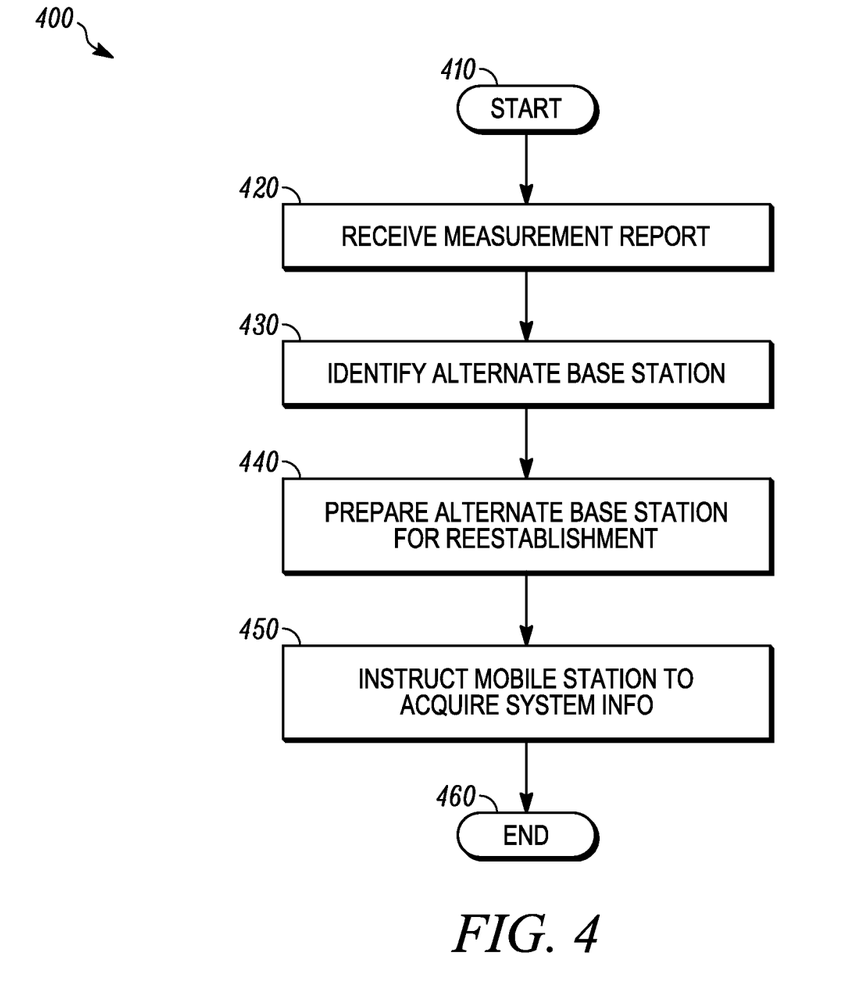
FIG. 4 is an exemplary flowchart illustrating the operation of a base station according to a possible embodiment.

FIG. 4 is an exemplary flowchart 400 illustrating the operation of the base station 135 according to a possible embodiment. At 410, the flowchart begins. At 420, a measurement report is received from a mobile station indicating presence of a cell operating on the same frequency as the base station 135. At 430, an alternate base station on a different frequency is identified in response to receiving the measurement report. At 440, an alternate base station is prepared for reestablishment for the mobile station. At 450, the mobile station is instructed to acquire system information of the alternate base station. When instructing the mobile station to acquire system information, gaps can be assigned for the mobile station to acquire system information from the alternate base station. At 460, the flowchart 400 ends.

Figure 5:
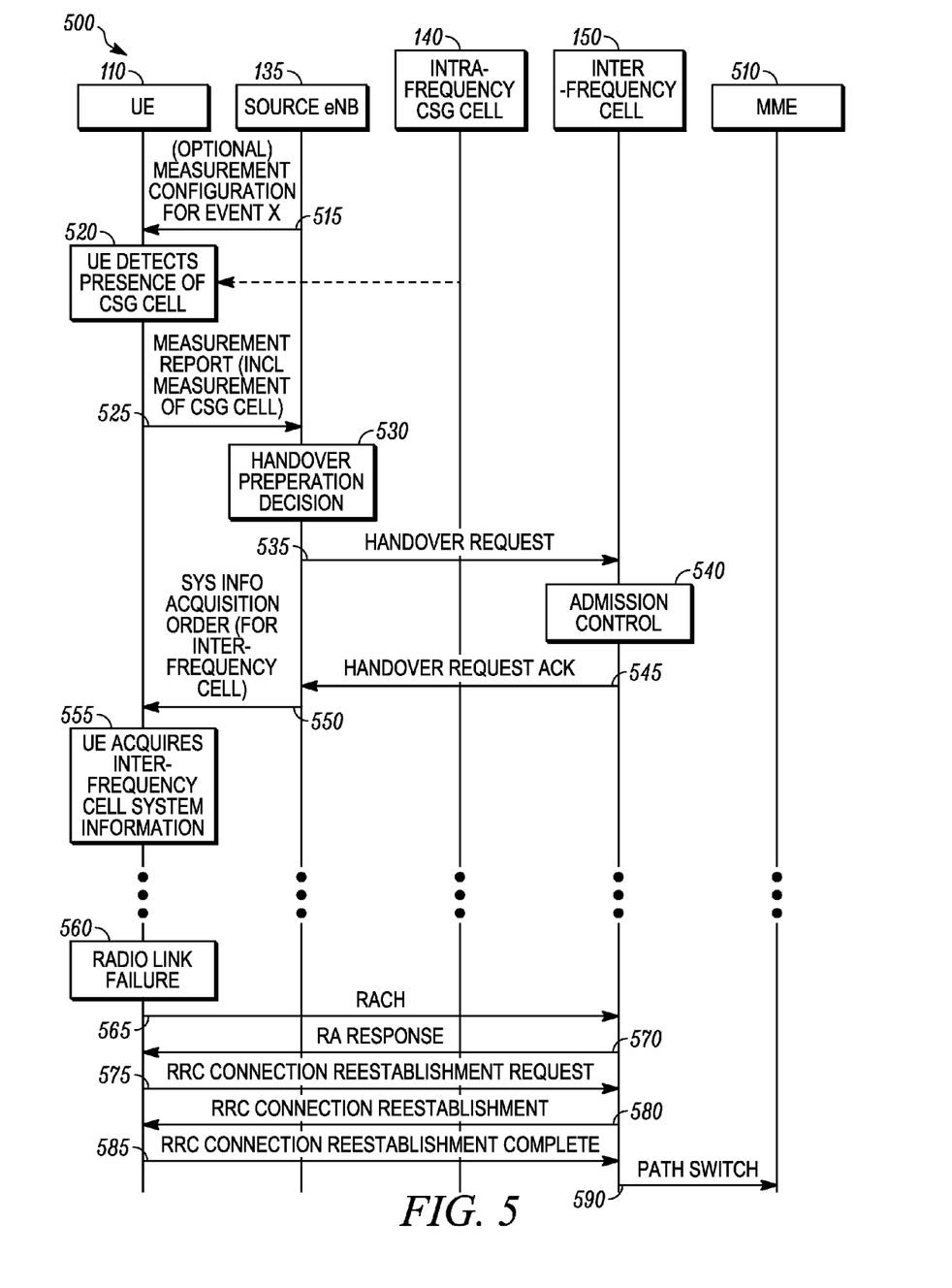
FIG. 5 is an exemplary signal flow diagram of a system according to a possible embodiment.

FIG. 5 is an exemplary signal flow diagram 500 of the system 100 according to a possible embodiment. The signal flow diagram 500 illustrates signals between the terminal 110, the serving or source base station 135, the intra-frequency cell 140, the inter-frequency cell 150, and a mobility management entity 510. At 515, the source base station 135 can provide a measurement configuration for an event that triggers a measurement report. At 520, the terminal 110 can detect the presence of an intra-frequency cell, such as the cell 140. At 525, the terminal 110 can send a measurement report to the source base station 135. The measurement report can include a measurement of the detected intra-frequency cell 140. At 530, the source base station 135 can make a handover preparation decision. At 535, the source base station 135 can send a handover request to the inter-frequency cell 150. At 540, the inter-frequency cell 150 can perform admission control to determine whether the terminal 110 is allowed to attach to the inter-frequency cell 150. At 545, the inter-frequency cell 150 can send a handover request acknowledgement message to the source base station 135. At 550, the source base station 135 can send a system information acquisition order for the inter-frequency cell 150 to the terminal 110. At 555, the terminal 110 can acquire inter-frequency cell system information for the inter-frequency cell 150. At 560, the terminal 110 can experience radio link failure. At 565, the terminal 110 can send a random access channel signal to the inter-frequency cell 150 and initiate a connection procedure with the inter-frequency cell 150. At 570, the inter-frequency cell 150 can send a random access response to the terminal 110. The random access response can include an uplink grant. At 575, the terminal 110 can send a radio resource control connection reestablishment request to the inter-frequency cell 150. At 580, the inter-frequency cell 150 can send a radio resource control connection reestablishment message to the terminal 110. At 585, the terminal 110 can send a radio resource control connection reestablishment complete message to the inter-frequency cell 150. At 590, the inter-frequency cell 150 can send a path switch message to the mobility management entity 510.

The methods of this disclosure may be implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a mobile station, the method comprising:
   establishing bi-directional communication between the mobile station and a serving base station;
   determining that a radio link parameter of an intra-frequency neighbor base station of the serving base station is better than a first threshold;
   determining that a radio link parameter of an inter-frequency neighbor base station is better than a second threshold; and
   decoding a system information message of the inter-frequency neighbor base station only if the radio link parameter of the intra-frequency neighbor base station is better than the first threshold and the radio link parameter of the inter-frequency neighbor base station is better than the second threshold;
   wherein the first threshold differs from the second threshold.

2. The method according to claim 1, wherein a radio link parameter comprises a reference signal received power parameter.

3. The method according to claim 1 further comprising sending a measurement report to the serving base station, the measurement report indicating that the radio link parameter of the inter-frequency neighbor base station is better than the second threshold.

4. The method according to claim 1 further comprising sending a measurement report to the serving base station, the measurement report indicating that the radio link parameter of the intra-frequency neighbor base station is better than the another first threshold.

5. The method according to claim 1, wherein the radio link parameter of the inter-frequency neighbor base station is computed from at least one of a plurality of measured parameters, the plurality of measured parameters including a measured parameter of the inter-frequency base station.

6. The method according to claim 1 further comprising determining that the mobile station is not allowed to access the intra-frequency neighbor base station, wherein decoding the system information message comprises decoding the system information message of the inter-frequency neighbor base station if the intra-frequency neighbor base station is present, if the radio link parameter of the inter-frequency neighbor base station is better than the second threshold, and if the mobile station is not allowed to access the intra-frequency neighbor base station.

7. The method according to claim 1 further comprising receiving an instruction from the serving base station to acquire the system information message of the inter-frequency neighbor base station.

8. The method according to claim 1 further comprising receiving gap assignments for system information message acquisition if the radio link parameter of the inter-frequency neighbor base station is better than the second threshold.

9. The method according to claim 1 further comprising:
determining radio link failure on the serving base station after decoding the system information message; and
performing reestablishment on the inter-frequency neighbor base station using the decoded system information message in response to determining radio link failure on the serving base station.

10. The method according to claim 9 further comprising receiving buffered data after performing reestablishment.

11. The method according to claim 1, wherein determining a radio link parameter of an intra-frequency neighbor base station of the serving base station is better than a first threshold comprises determining that a radio link parameter of an inaccessible intra-frequency neighbor base station of the serving base station is better than a first threshold.

12. An apparatus comprising:
a wireless communication device housing;
a transceiver coupled to the wireless communication device housing, the transceiver configured to establish bi-directional communication between the mobile station and a serving base station;
a controller coupled to the transceiver, the controller configured to control operations of the apparatus;
a frequency neighbor base station parameter determination module coupled to the controller, the frequency neighbor base station parameter determination module configured to determine that a radio link parameter of an intra-frequency neighbor base station is better than a first threshold and determine that a radio link parameter of the inter-frequency neighbor base station is better than a second threshold; and
a system information message acquisition module coupled to the controller, the system information message acquisition module configured to acquire and decode a system information message of the inter-frequency neighbor base station only if the radio link parameter of the intra-frequency neighbor base station is better than the first threshold and if the radio link parameter of the inter-frequency neighbor base station is better than the second threshold;
wherein the first threshold differs from the second threshold.

13. The apparatus according to claim 12, wherein the controller is configured to send, via the transceiver, a measurement report to the serving base station, the measurement report indicating that the radio link parameter of the inter-frequency neighbor base station is better than the second threshold and indicating that the radio link parameter of the intra-frequency neighbor base station is better than the previously presented first threshold.

14. The apparatus according to claim 12, wherein the controller is configured to determine that the intra-frequency neighbor base station is a home base station.

15. The apparatus according to claim 12,
wherein the controller is configured to determine that a mobile station is not allowed to access the intra-frequency neighbor base station, and
wherein the system information message acquisition module is configured to acquire and decode the system information message of the inter-frequency neighbor base station if the intra-frequency neighbor base station is the radio link parameter of the intra-frequency neighbor base station is better than the first threshold, if the radio link parameter of the inter-frequency neighbor base station is better than the second threshold, and if the mobile station is not allowed to access the intra-frequency neighbor base station.

16. The apparatus according to claim 12, wherein the controller is configured to determine radio link failure on the serving base station after acquiring the system information message and configured to perform reestablishment on the inter-frequency neighbor base station using the acquired system information message in response to determining radio link failure on the serving base station.

* * * * *